Nov. 18, 1958  T. M. SELLER ET AL  2,861,223
RECLOSING RELAY FOR CIRCUIT BREAKER
Filed July 9, 1956  2 Sheets-Sheet 1
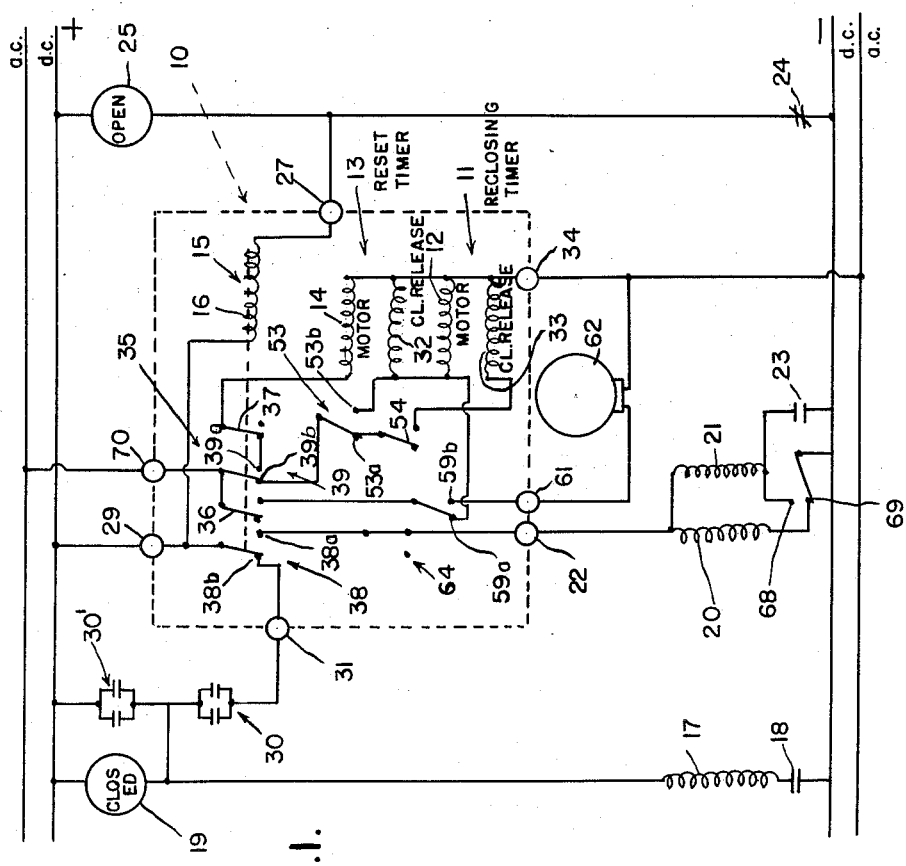
FIG.I.
INVENTORS
THOMAS M. SELLER
LEO K. HARRIS
BY Whittemore, Hulbert
Belknap ATTORNEYS Nov. 18, 1958 T. M. SELLER ET AL 2,861,223
RECLOSING RELAY FOR CIRCUIT BREAKER
Filed July 9, 1956 2 Sheets-Sheet 2
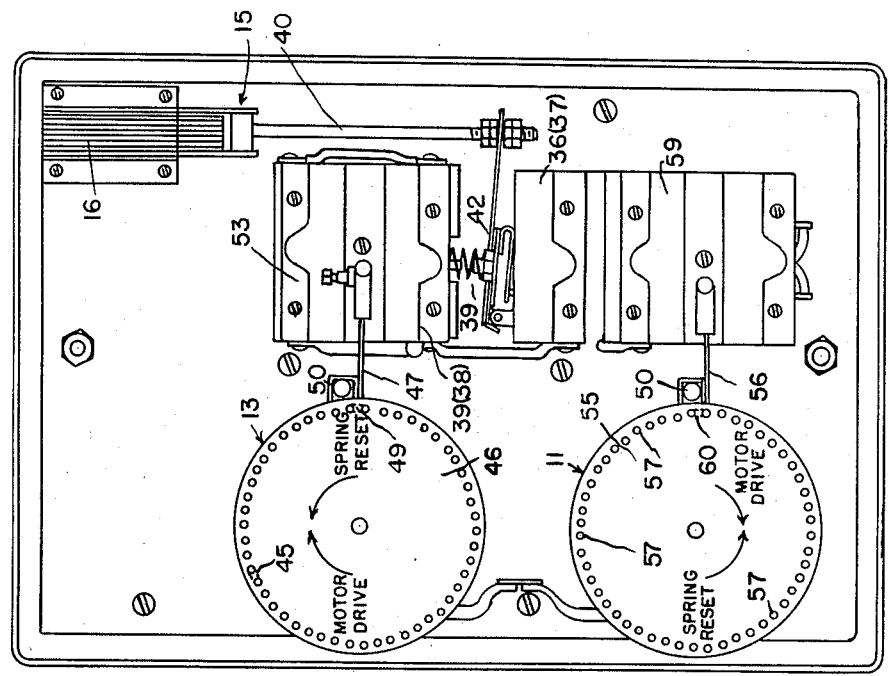
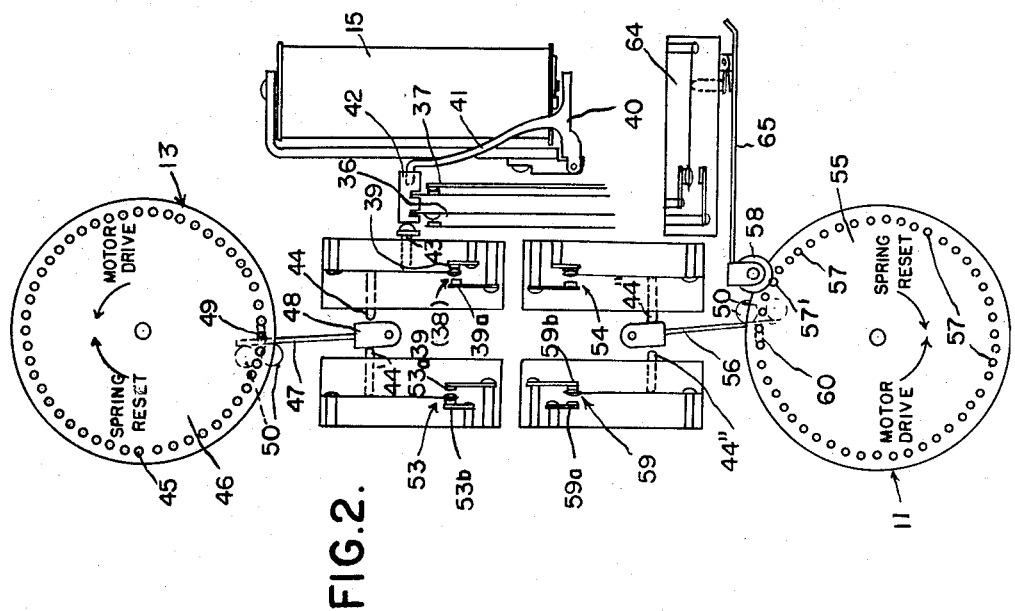
INVENTORS.
THOMAS M. SELLER
LEO K. HARRIS
BY Whittemore, Hulbert &
Belknap
ATTORNEYS

United States Patent Office 2,861,223
Patented Nov. 18, 1958

2,861,223

RECLOSING RELAY FOR CIRCUIT BREAKER

Thomas M. Seller and Leo K. Harris, Detroit, Mich., assignors to The Detroit Edison Company, Detroit, Mich., a corporation of New York Application July 9, 1956, Serial No. 596,472

6 Claims. (Cl. 317—22)

The present invention relates to an improved circuit breaker reclosing relay capable of use in alternating- or direct-current controlled circuits. Although an important installation of a reclosing relay of this type is naturally in a power distribution circuit, it is to be understood that the improvement according to the invention, operable as it is under A.-C. or D.-C. control, actually has universal application to the reclosing of circuit breakers of every description.

It is a general object of the invention to provide a relay operating on an improved reclosing, resetting and lock-out cycle which will eliminate inherent difficulties in the operating cycles employed by available conventional reclosing relays, and which will insure full protection of equipment in the system supplied through the breaker without undue delay in the restoration of service following tripping of the circuit breaker as the result of a line fault or the like.

Of the two basic types of reclosing relay presently available, one operates on a so-called "reversing" cycle, in which there is a possibility that a low-current permanent fault in the line will fail to lock-out the relay. On each reclosure the relay motor reverses and begins to reset during the time that the overcurrent relays are timing out; and if the tripping time is more than a few seconds, the reclosing contact will open, resetting the relay for another reclosure on the same contact point. Transformers, regulators, breakers and lines have been damaged in some instances in this manner, and at least in a single instance the planned coordination of a station breaker with an automatic sectionalizing pole-top switch was disrupted to delay a restoration of service to several stations.

In another, so-called "straight-through" reclosing relay cycle, a strong possibility exists of unnecessary lockouts being caused by repetition of the fault within a predetermined interval. Thus, after each reclosure the relay runs on toward the lock-out position, whether or not the circuit breaker holds. If the breaker stays closed long enough, the relay will run past the lock-out position and reset; however, if the breaker trips at any time between the last reclosing position and the relay lock-out position, the relay locks out, even though the breaker may have opened only twice and held closed over as much as three minutes between openings. Serious delays in restoration of service have been occasioned in the operation of the "straight-through" relay cycle for this reason.

Therefore, the invention provides an improved breaker reclosing relay which avoids the operational disadvantages set forth in the preceding two paragraphs, by performing in an ideal reclosing cycle not susceptible of permitting additional damage to equipment or undue delay in service restoration such as inhered in the previous relay cycles.

In attainment of this general end, it has been the object of the invention to devise a reclosing relay cycle in which it is impossible under any combination of tripping times or separated, transient faults to effect more than a predeterminedly selected and preset number of reclosures from the time the relay leaves its normal position until it returns to that position; in which it is impossible to lock out the relay short of the preset number of reclosures; and in which it is impossible for the time interval between breaker opening and breaker reclosure to be either increased or decreased from the selected predetermined setting by reason of the breaker remaining closed for longer or shorter intervals, short of the time required to reset the relay.

The foregoing as well as other objects will be made more apparent as this description proceeds, especially when considered in connection with the accompanying drawings, wherein:

Fig. 1 is a schematic diagram showing components and wiring of an automatic reclosing relay in accordance with our invention;

Fig. 2 is a schematic lay-out of certain structural components of the diagram of Fig. 1 indicating in a general way the mechanical operation of reclosing and reset timer motors and a control relay in the operation of various contact units of the system; and Fig. 3 is an elevational view generally illustrating the actual arrangement of the motors, relay and contact units as embodied in an operative reclosing relay according to the invention, a cam-controlled contact unit having been removed to expose other parts.

Referring to Figs. 1 and 2 of the drawings, the improved reclosing relay, generally designated 10, employs two separate timer motors, namely a reclosing timer 11 whose motor winding is indicated 12 in Fig. 1, and a reset timer 13 whose corresponding winding is designated 14. A main control relay 15 is adapted to be energized and de-energized with the opening and closing, respectively, of the circuit breaker (not shown as a whole) with which the improved reclosing relay 10 is associated. The coil 16 of control relay 15 is shown in Fig. 1.

As included in the circuit of Fig. 1, a circuit breaker opening coil is designated 17, being connected in series with an auxiliary switch 18 and a pilot lamp 19 (illuminated when the breaker is closed) across the positive and negative sides of the usual potential supply.

The reference numeral 20 designates the operating coil of the breaker closing contactor, which coil is wired from terminal 22 of relay 10 to the negative terminal of the control potential supply, in series with a contact 69 of contactor cut-off relay 21 which opens when the cut-off relay is energized. The operating winding 21 of this cut-off relay is wired in parallel with the contactor circuit from terminal 22 to the negative supply, in series with two contacts in parallel, namely, an auxiliary switch 23 which closes upon closure of the breaker, and a "seal-in" contact 68 of the cut-off relay itself. A further auxiliary switch 24 of the circuit breaker, which closes as the breaker opens, is connected to a terminal 27 to energize the control relay 15; this switch may in many cases be the same one used to energize the pilot lamp 25 which illuminates when the breaker is open, as in Fig. 1.

The reference numeral 30 of Fig. 1 designates the paralleled tripping contacts of a set of instantaneous tripping relays which operate at once upon the occurrence of a line fault. Reference numeral 30' designates the parallel tripping contacts of a set of time-delay tripping relays. The sets of contacts 30, 30' have a common connection to the circuit breaker opening coil 17 and are otherwise connected, respectively, the set 30 to an external terminal 31 of relay 10, and the set 30' to the positive terminal of the control-voltage source. Pilot lamp 19 is generally connected in parallel with contacts 30', both to indicate when the breaker is closed and to provide a constant check on the continuity of the opening coil circuit.

Otherwise, essential components of the reclosing relay are a re-set timer clutch release coil 32, which when energized disengages the gear train of the re-set timer 13 and permits a control disk thereof (to be described) to return quickly to its starting position; a reclosing timer clutch release coil 33, which performs the same function for reclosing timer 11; and a set 35 of contacts operated by control relay 15, hereinafter more fully described.

Prior to a detailed description of the mechanical and electrical arrangements of the individual components of relay 10, their general functions should be noted. The reclosing timer 11 runs when the circuit breaker (not shown) is open to successively operate its closing contacts (hereinafter referred to) after pre-set delays; and it remains stationary when the breaker is closed. It returns to its starting position on a signal received from re-set timer 13 after the breaker has remained closed for a pre-set time. If, after effecting every one of the reclosures in the sequence, the breaker opens before the reset timer 13 can time out, the reclosing timer 11 will proceed to a lock-out position and stop.

Reset timer 13 runs when the circuit breaker is closed and returns quickly to its starting position when the breaker opens. If the breaker remains closed for the required reset interval following any reclosure, the reset timer 13 operates its contacts, supplying signals to reset both timers to their starting positions and prepare all circuits for the start of a new sequence.

As indicated above the operation of the entire relay 10 is governed by control relay 15, the coil 16 of which is energized whenever the circuit breaker is open, i. e., upon closure of auxiliary switch 24. Control relay 15 operates the four contacts of set 35 in two quite different manners. Of this set, contacts 36 and 37, a pair of single throw shown open and closed repectively in Fig. 1, close and open respectively when relay coil 16 is energized, and return to their normal positions when the coil is de-energized.

The remaining two contacts of set 35 are double-throw, each governing "a" and "b" circuits as indicated by the respective sub-characters "a" and "b" in Fig. 1. These double-throw contacts, when operated on energizing of coil 16 of control relay 15, remain in the operated position regardless of the position of control relay 15 until they are reset by the operation of reset timer 13; i. e., they are not affected by the de-energizing of relay coil 16.

These two contacts, 38 and 39, may be said to possess a "memory action," inasmuch as their position depends upon the source of their last actuation. In the normal stand-by or re-set position, the last actuating impulse having been received from re-set timer 13, contacts 38a and 39a are open and contacts 38b and 39b are closed; while in the operated position, the last actuating impulse having been received from control relay 15, contacts 38a and 39a are closed and contacts 38b and 39b are open. It is thus seen that a series connection of re-set timer motor winding 14 through contacts 37 and 39a is possible, the re-set timer 13 running after control relay 15 has operated and its coil 16 is de-energized.

Referring now to Fig. 2 of the drawings, the contacts 38, 39 are re-set type snap-action switches; and in the interest of simplicity, only the re-set contacts 39a and 39b are shown, on the understanding that the contact components 38a and 38b are similarly controlled in respect to closure and opening, respectively, by control relay 15 and re-set timer 13. As illustrated in Fig. 2, the pivoted relay armature 40 has an operating extension arm 41 carrying an actuator piece 42 which controls the closing and opening, respectively, of the reversing contacts 36, 37. Switches 38, 39 have each a pin-type operating plunger 43, both of which are depressed by actuator 42, when relay coil 16 is energized, to transfer the contacts of switches 38, 39 to the operated position; and each switch has also a pin-type re-set plunger 44, both of which are depressed by lever 48 when re-set timer 13 completes its travel as predetermined by its setting. After operation of either plungers 43 or 44 the switches remain in the same position until the other plungers and operated. The same result is obtainable by the use of any of a variety of latch-type or toggle-type contact mechanisms, the intent being that the contacts 38a, 38b, 39a, 39b remain in their operated position, regardless of reclosures, openings after reclosure, or lockout, until the re-set timer 13 completes its predetermined travel and applies pressure to the re-set plungers 44.

The re-setting of the two reset-type snap-action switches 38, 39 simultaneously, to assure that neither can be re-set without the other, is accomplished by taking advantage of the fact that the mechaincal resistance offered by these switches to the depression of plunger 44 is greatly reduced when the internal contact lever of one snaps from the operated position to the re-set position. An adjustable striker pin 45, selectively positioned in one of a circumferential series of holes about the circular control disk 46 of re-set timer 13, projects on one side of disk 46; and upon counterclockwise rotation of the disk it is brought to press against a spring tappet wire 47 carried as an extension of a pivoted operating lever 48 adapted to bear against the plungers 44 of both snap-action switches 38, 39. As the disk revolves, spring 47 deflects until the force transmitted thereby, divided more or less equally between the two plungers 44, is sufficient to re-set either switch 38 or 39; and as the plunger 44 of this switch yields when the switch re-sets, the proportion of the force of spring 47 applied to the other plunger 44 is so greatly increased as to cause the other switch to re-set immediately.

The re-set timer disk 46 is equipped with a fixed projection 49 mounted in one or more of its circumferential series of holes and projecting from the same side of the disk as adjustable striker pin 45. When re-set timer clutch release coil 32 is energized, disk 46 rotates in the clockwise direction until this fixed projection 49 engages spring 47, swinging arm 48 in the opposite direction. The reference numeral 50 designates resilient fixed bumpers yieldably sustaining the spring 47 in this last, returned position.

An off-normal switch 53 is mounted in the same general assembly with switches 38, 39, but on the opposite side of the pivoted operating lever 48, in such position that its plunger 44' is depressed when the disk 46 is in the returned position described above. This is a standard pin-type snap-action switch, generally similar to switches 38, 39 but having only one plunger, which operates the contacts in one direction on depression and in the other direction on release. Contact 53a, arbitrarily defined as the one which is closed whenever disk 46 is away from its normal position, provides a circuit through contact 39b to energize re-set timer clutch release coil 32; and the return of disk 46 to its normal position operates through projection 49, spring 47, lever 48 and plunger 44' to open contact 53a and close contact 53b. Opening contact 53a de-energizes re-set timer clutch release coil 32; and unless the reclosing timer 11 is in its normal position (contact 54 open as described below), closing contact 53b energizes reclosing timer clutch release coil 33.

Reclosing timer 11 has a further off-normal contact 54, the function of which is to permit reclosing timer clutch release coil 33 to be energized when disk 55 is away from its normal or re-set position, and to de-energize coil 33 when disk 55 is in its normal position. It is similar to switch 53 and is operated in a similar manner, through fixed projection 60 on disk 55 engaging pivoted lever 56 to depress plunger 44" of switch 54. A pair of resilient stops 50, similar to those described above, are so placed as to cushion the blow of projection 60 against lever 56 and limit the force applied to plunger 44" of switch 54.

A further contact 59 is controlled by reclosing timer disk 55, the pivoted lever arm 56 and the plunger 44" in the manner illustrated in Figure 2, and as will be understood without further description. The operation of lever arm 56 from disk 55 is effected in both directions by the fixed projection 60. As oppositely engaged by projection 60 at the two extremes of the travel of disk 55, the arm 56 is swung to alternately control the contacts 54, 59. Contact 59 is a lock-out contact, having "a" and "b" circuits as illustrated in Figs. 1 and 2. The 59b contact is adapted to disconnect the current supply to the reclosing timer motor winding 12, as illustrated in Fig. 1, while contact 59a is wired to a terminal 61 to permit the use of an external lock-out alarm device 62 of any desired character. If the circuit breaker has not remained closed for the re-set interval after any reclosure of the sequence performed by timer 11, the lock-out contact 59 will halt reclosing timer 11 at the end of its travel.

The disk 55 is perforated with a circumferential series of holes in which a number of striker pins 57 engageable with a follower roller 58 can be removably fitted, one for each desired reclosure. These striker pins project on the opposite side of disk 55 from the fixed projection 60, and serve the basic purpose of controlling the operation of the contact 64 of the reclosing relay circuit, thus controlling the circuit to the closing contactor 20 and cut-off relay 21. The follower roller 58 is mounted on an arm 65 (Fig. 2) which operates contact 64 to close the circuit each time the roller is engaged and lifted by a pin 57. If an immediate initial reclosure of the circuit breaker is desired upon opening thereof, it is necessary only to set a striker pin to hold contact 64 closed at the re-set position, for example, as effected by the pin specially designated 57' in Fig. 2. With this setting, the coil 20 of the circuit breaker closing contactor will be energized as soon as control relay 15 operates and closes the contact 38a of the set of contacts 35.

In operation, let it be assumed that the circuit breaker (not shown) is in its closed position and both timers 11, 13 are re-set, all of the "a" contacts of relay 10 are as shown in Fig. 1, namely contacts 36, 38a, 39a 53a, 54 and 59a are open, but the reclosing contact 64 is closed, in which position it is maintained by a striker pin 57' in the re-set position of timer 11. Contact 37 is closed and all of the other "b" contacts of relay 10 are closed at this time.

A. *Instantaneous initial trip*

When a line fault occurs, the instantaneous tripping relays operate their contacts 30 to trip the circuit breaker (not shown). The circuit is from the positive control bus through the terminal 29, through contact 38b, terminal 31 and contacts 30, thence through the breaker opening coil 17 and auxiliary switch 18 to the negative bus. The breaker opens, and the attendant opening of switch 18 then interrupts the tripping current.

B. *Immediate initial reclosure*

In accomplishing an immediate initial reclosure the breaker approaches the open position and its auxiliary switch 24 closes as it does. This lights the "open" pilot lamp 25 and energizes the coil 16 of control relay 15, whereupon the control relay operates all of its contacts 36, 37, 38 and 39. As a result, among others, contact 38b opens and opens the circuit through terminal 31 to the instantaneous tripping relay contacts 30. Contact 38a closes and completes the circuit through the already closed contact 64 to terminal 22 and the closing contactor coil 20. Other operations conditioned by the operation of control relay 15 will be referred to hereinafter in detail.

Upon energization of contactor coil 20 by closing of contact 38a, the closing contactor closes its contacts (not shown), energizing the circuit breaker's closing mechanism which causes the breaker to close. As it leaves its open position the auxiliary switch 24 is opened, extinguishing the "open" pilot lamp and de-energizing control relay coil 16. As the breaker approaches its closed position, it first closes its auxiliary switch 18, preparing the trip circuit for the next opening, and later closes its auxiliary switch 23, energizing the cut-off relay coil 21. The cut-off relay operates, closing a "seal-in" contact 68 in parallel with auxiliary switch 23 and opening a contact 69 in series with the closing contactor coil 20. The contactor opens its contacts (not shown), de-energizing the closing motor or solenoid; and these contacts will not then be capable of reclosure until terminal 22 has been de-energized and re-energized.

C. *Re-set timer*

As pointed out above, the de-energizing of control relay 15 does not alter the position of the contacts 38, 39 in which they were originally placed by the operation of relay 15; they remain closed on the "a" side. However, the de-energization does open contact 36, as will be apparent from Fig. 2, de-energizing the motor winding 12 of reclosing timer 11 and de-energizing the re-set timer clutch release coil 32. De-energization of control relay coil 16 also closes contact 37, completing the circuit to the coil 14 of re-set timer motor 13. This circuit is from a terminal 70 of the control supply line through contact 39a (held closed until re-set), contact 37 and winding 14 of re-set timer 13, the other terminal of which winding is connected to the external terminal 34 of the relay 10.

Reclosing timer 11 halts and re-set timer 13 commences to run; and if the circuit breaker remained closed, the timer 13 would continue to run until the striker pin 45 on its disk 46 engages the spring arm 47 and re-sets the contacts 38, 39, after which both timers 11, 13 would re-set in sequence to their starting positions. However, it will be assumed that the line fault is repeated before re-set timer 13 can complete its travel in this fashion.

D. *Time-delay tripping*

Recurrence of the line fault is as before, causing operation of instantaneous tripping relays 30; however, inasmuch as contact 38b is open, having been opened by the initial operation of relay 15, no circuit exists through which tripping relays 30 can trip the circuit breaker. Tripping is therefore delayed until the time delay relays 30' close their contacts to energize circuit breaker opening trip coil 17 through a circuit which is entirely independent of the reclosing relay, i. e., the circuit in which relays 30' and pilot lamp 19 are paralleled and in series with coil 17 and auxiliary switch 18 across the control supply terminals. The opening operation from this point, involving energization of relay 15 and illumination of lamp 25, is the same as before.

As the breaker opens, it again closes its auxiliary switch 24 energizing the control relay 15. The contacts 38, 39 are not affected, since they are already in an operated position, i. e., with "a" circuits closed. The contact 37 opens, halting re-set timer motor 13; and contact 36 closes, energizing the re-set timer clutch release coil 32 and the winding 12 of reclosing timer motor. Re-set timer 13 thus returns to its starting position, and the reclosing timer 11 begins to run.

The reclosing timer 11 has not moved since the circuit breaker last reclosed, so that the time required for it to reach the next reclosure position, as determined by an adjustable striker pin 57 on its disk 55, is in no way affected by the length of time that the breaker remained closed before the time-delay opening. After timer 11 has run for a few seconds, the striker pin 57' will move past the roller actuator 58 of contact 64, allowing the latter to open, thus de-energizing cut-off relay coil 21 and allowing the cut-off relay to open contact 68 and close contact 69.

Accordingly, when the next striker pin 57 reaches roller 58 to reclose contact 64 the energized coil 20 will pick up and close the circuit breaker closing contacts, the breaker closing mechanism will close the circuit breaker, the auxiliary switch 23 will energize the cut-off relay 21, and the closing contacts of the breaker will open and cut off the closing motor or solenoid as before.

This process may be repeated as many times as there are striker pins 57 set in the disk 55 of reclosing timer 11. The only limitation on this number which is imposed by the relay is that the pins 57 must be spaced enough to allow roller 58 to open contact 64 between the pins.

E. *Lock-out*

If the circuit breaker does not remain closed long enough for re-set timer 13 to complete its travel following any reclosure in the sequence, the reclosing timer 11 will complete its full revolution and operate a lock-out contact 59. Opening of contact 59a de-energizes clutch release coil 32 of re-set timer 13, as well as the motor winding 12 of reclosing timer 11. The closing of contact 59b completes a circuit through external terminal 61 of the relay 10 and lock-out alarm 62, which may audibly or otherwise give notice of the lock-out condition.

F. *Re-set*

If the breaker remains closed for the predetermined re-set period, whether after an automatic reclosure in sequence or manual reclosure by an operator when the relay is in lock-out position, the adjustable striker pin 45 on the disk 46 of reset timer 13 operates to re-set the contacts 38, 39 by actuating the spring lever arm 47.

After this occurs, contact 38a opens the reclosing circuit through contact 64, if closed, to external terminal 22 and the closing contactor coil 20. At the same time, contact 38b is closed and restores the circuit to the instantaneous tripping relay 30; contact 39a opens the circuit through the further contact 37 to the motor winding 14 of re-set timer 13; and contact 39b closes a circuit through contact 53a to the clutch release coil 32 of re-set timer 13, which thereupon re-sets.

When the disk 46 of the re-set timer reaches the starting position, the fixed projection 49 engages spring lever 47, pressing it away from the contacts 38, 39 and against the contact 53. Contact 53a opens the circuit to the clutch release coil 32 of re-set timer 13 and contact 53b transfers the re-set circuit to the clutch release coil 33 of reclosing timer 11.

When the disk 55 of the reclosing timer reaches its starting position, it opens contact 54 thereby opening the circuit to its own clutch release coil 33. Arriving at starting position, the striker pin 57' positions the roller actuator 58 of contact 64 to set up the circuit for an immediate initial reclosure. This completely re-sets the relay 10 for a new sequence of operation.

It is to be understood that structural and operational features described above are solely for the purpose of illustrating the sequence of operations followed in the attainment of the objects of the invention. Individual variations are of course possible, and may involve changes in the structural components and appearance of the mechanism, but without essentially departing from the spirit and intent of the invention.

For example, in respect to the control of operation of the timers 11, 13 in relation to the position of the circuit breaker, these changes as described are caused to react upon the motor circuits of the timers through the operation of contacts 36 and 37, in response to the energization and de-energization of control relay 15. It will be evident to those skilled in the art that the control of the motor circuits in question can equally well be brought out of the relay and effected by separate auxiliary switches of the circuit breaker.

Further, the memory device actually shown to control contacts 38 and 39 comprises reset-type snap-action switches operated together by the operation of control relay 15 and re-set timer 13, through disk 46, pin 45, spring 47 and lever 18. Other means to accomplish this memory action will suggest themselves, for example a latch-in relay, a toggle-type relay or a polarized relay; and, moreover, any of the devices referred to may be operated in resetting by direct mechanical means in the rotation of disk 46, or by electromagnetic re-setting through a contact operated in response to rotation of the disk.

The operation of the single control relay 15 to perform a dual function, operating contacts 36, 37 in both directions and contacts 38, 39 in one direction only, has been described. The two functions could, of course, be performed by separate relays, if desired. By the same token, if an alternative memory device were employed, as described above, in lieu of the reset-type snap-action switches 38, 39, its function is combinable with that of control relay 15.

Other modifications and refinements will no doubt suggest themselves to those skilled in the art, and it is to be understood that such equivalents are contemplated as being within the scope of the invention, unless otherwise qualified in the appended claims.

What we claim as our invention is:

1. A relay unit to effect reclosure of an electrically actuable circuit breaker through its closing control circuit following openings in response to line fault or the like, comprising a reclosing timer having a circuit including means governing said timer in reference to circuit breaker position to advance while the circuit breaker is open and to remain stationary while the circuit breaker is closed, contacts controlled by said reclosing timer to initiate periodic reclosing operations of said circuit breaker closing control circuit, a re-set timer controlled by a circuit governed by circuit breaker position to advance after the circuit breaker has been reclosed and to reset to its starting position if the circuit breaker opens; a control device electrically energized when said circuit breaker opens to reversibly make and break said reclosing and reset timer circuits; and a two-position memory device actuated by said control device to one position upon opening of the circuit breaker to energize said timers, and actuated by said reset timer to another position on completion of a pre-set travel of said re-set timer to return both timers to their starting positions.

2. A relay unit to effect reclosure of an electrically actuable circuit breaker through its closing control circuit following openings in response to line fault or the like, comprising a reclosing timer, means governing said timer in reference to circuit breaker position and through a circuit including an auxiliary control relay to advance while the circuit breaker is open and to remain stationary while the circuit breaker is closed, contacts controlled by said reclosing timer to initiate periodic reclosing operations of said circuit breaker closing control circuit, a re-set timer governed by circuit breaker position through a circuit including an auxiliary control relay to advance after the circuit breaker has been reclosed and to re-set to its starting position if the circuit breaker opens; a control device electrically energized when said circuit breaker opens to reversibly make and break said reclosing and reset timer circuits; and a two-position memory device actuated by said control device to one position upon opening of the circuit breaker to activate the control relay circuits and energize said timers, and actuated by said reset timer to another position on completion of a pre-set travel of said re-set timer to return both timers to their starting positions.

3. A relay unit to effect reclosure of an electrically actuable circuit breaker through its closing control circuit following openings in response to line fault or the like, comprising a reclosing timer, means governing said timer in reference to circuit breaker position to advance while the circuit breaker is open and to remain stationary while the circuit breaker is closed, contacts controlled by said reclosing timer to initiate periodic reclosing operations of said circuit breaker closing control circuit, a re-set timer governed by circuit breaker position to advance after the circuit breaker has been reclosed and to re-set to its starting position if the circuit breaker opens; a control device electrically energized when said circuit breaker opens to reversibly make and break said reclosing and reset timer circuits; and a two-position memory device comprising reset-type contacts and being actuated by said control device to one position upon opening of the circuit breaker to energize said timers, and actuated by said reset timer to another position on completion of a pre-set travel of said re-set timer to return both timers to their starting positions.

4. A relay unit to effect reclosure of an electrically actuable circuit breaker through its closing control circuit following openings in response to line fault or the like, comprising a reclosing timer, means governing said timer in reference to circuit breaker position and through a circuit including an auxiliary control relay to advance while the circuit breaker is open and to remain stationary while the circuit breaker is closed, contacts controlled by said reclosing timer to initiate periodic reclosing operations of said circuit breaker closing control circuit, a re-set timer governed by circuit breaker position through a circuit including an auxiliary control relay to advance after the circuit breaker has been reclosed and to re-set to its starting position if the circuit breaker opens; a control device electrically energized when said circuit breaker opens to reversibly make and break said reclosing and reset timer circuits; and a two-position memory device comprising reset-type contacts and being actuated by said control device to one position upon opening of the circuit breaker to activate the control relay circuits and energize said timers, and actuated by said reset timer to another position on completion of a pre-set travel of said re-set timer to return both timers to their starting positions.

5. A relay unit in accordance with claim 1, in which said reclosing timer controls a reclosure contact, and adjustable means to maintain said contact closed at the starting position of said timer.

6. A relay unit to effect reclosure of an electrically actuable circuit breaker through its closing control circuit following openings in response to line fault or the like, comprising a reclosing timer having a circuit including means governing said timer in reference to circuit breaker position to advance while the circuit breaker is open and to remain stationary while the circuit breaker is closed, contacts controlled by said reclosing timer to initiate periodic reclosing operations of said circuit breaker closing control circuit, a re-set timer controlled by a circuit governed by circuit breaker position to advance after the circuit breaker has been reclosed and to reset to its starting position if the circuit breaker opens; a control device electrically energized when said circuit breaker opens to reversibly make and break said reclosing and reset timer circuits; and a two-position memory device actuated by said control device to one position upon opening of the circuit breaker to energize said timers, and actuated by said reset timer to another position on completion of a pre-set travel of said re-set timer to return both timers to their starting positions; said control device comprising a control relay reversibly controlling contacts to make and break said timer circuits, and said memory device comprising sets of contacts reversibly made and broken by said relay and said re-set timer, respectively.

References Cited in the file of this patent

UNITED STATES PATENTS

| | | |
|---|---|---|
| 2,421,630 | Light | June 3, 1947 |
| 2,439,920 | Brown | Apr. 20, 1948 |
| 2,506,546 | Farrell | May 2, 1950 |
| 2,582,027 | Goff | Jan. 8, 1952 |